US012715256B2

(12) United States Patent
Volkman et al.

(10) Patent No.: US 12,715,256 B2
(45) Date of Patent: Aug. 25, 2026

(54) VOCATIONAL VEHICLE WITH COMPACT SUSPENSION ASSEMBLY

(71) Applicant: Oshkosh Corporation, Oshkosh, WI (US)

(72) Inventors: Steve Volkman, Oshkosh, WI (US); Erik Ellifson, Oshkosh, WI (US); Evan Schertz, Oshkosh, WI (US); David Steinberger, Oshkosh, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/244,489

(22) Filed: Jun. 20, 2025

(65) Prior Publication Data

US 2025/0388056 A1 Dec. 25, 2025

Related U.S. Application Data

(60) Provisional application No. 63/662,744, filed on Jun. 21, 2024.

(51) Int. Cl.

*B60G 3/20* (2006.01)
*B60G 7/00* (2006.01)
*B60G 11/14* (2006.01)

(52) U.S. Cl.

CPC ................. *B60G 3/20* (2013.01); *B60G 7/00* (2013.01); *B60G 11/14* (2013.01); *B60G 2200/144* (2013.01); *B60G 2200/44* (2013.01); *B60G 2204/124* (2013.01); *B60G 2204/148* (2013.01); *B60G 2206/0114* (2013.01); *B60G 2206/121* (2013.01); *B60G 2300/026* (2013.01); *B60G 2300/09* (2013.01); *B60G 2300/50* (2013.01);

(Continued)

(58) Field of Classification Search

CPC ................ B60G 3/20; B60G 2200/144; B60G 2200/44; B60G 2206/121; B60G 2206/0114; B60G 2300/026; B60G 2300/09; B60G 2300/02; B60G 2300/50; B60G 2204/15; B60G 2204/124; B60G 2204/148; B60G 2204/1244; B60G 11/14; B60G 11/16; B60G 7/00; B60G 7/02; B60G 7/04; B60Y 2200/14; B60Y 2200/142; B60Y 2200/1422; B60Y 2200/144; B60Y 2200/145

USPC .... 280/124.109, 124.125, 124.134, 124.135, 280/124.136, 124.139, 124.141, 124.179; 267/251, 525

See application file for complete search history.

(56) References Cited

U.S. PATENT DOCUMENTS 2,866,651 A * 12/1958 Powell .................... B60G 3/26 280/124.141
4,813,704 A * 3/1989 Smith .................... B60G 3/265 280/124.171

(Continued)

*Primary Examiner* — Keith J Frisby

(74) *Attorney, Agent, or Firm* — Foley & Lardner LLP

(57) ABSTRACT

A suspension assembly includes a knuckle, a subframe coupled to the frame rail by a plurality of brackets, an H-arm coupled between the knuckle and the subframe, an upper control arm arranged above the H-arm and coupled between the knuckle and the subframe, and a dual spring assembly biased between the knuckle and the subframe. The dual spring assembly includes a first spring that is nested within and arranged in series with a second spring, and the first spring defines a lower spring rate than the second spring.

20 Claims, 14 Drawing Sheets

(52) U.S. Cl.
CPC . *B60Y 2200/1422* (2013.01); *B60Y 2200/144* (2013.01)

(56) References Cited

U.S. PATENT DOCUMENTS

| | | | | |
|---|---|---|---|---|
| 6,105,984 | A * | 8/2000 | Schmitz | B60G 11/14 280/124.179 |
| 12,491,943 | B1 * | 12/2025 | Calliari | B62D 21/03 |
| 2006/0261570 | A1 * | 11/2006 | Eshelman | B60G 3/20 280/124.137 |
| 2019/0178329 | A1 * | 6/2019 | Dumitru | B60G 17/08 |
| 2019/0337348 | A1 | 11/2019 | Venton-Walters et al. | |
| 2021/0394576 | A1 | 12/2021 | Venton-Walters et al. | |
| 2021/0394578 | A1 | 12/2021 | Ellifson et al. | |
| 2022/0080944 | A1 | 3/2022 | Linsmeier et al. | |
| 2022/0134834 | A1 | 5/2022 | Venton-Walters et al. | |
| 2023/0070769 | A1 | 3/2023 | Wheeler et al. | |
| 2023/0074504 | A1 | 3/2023 | Ellifson et al. | |
| 2024/0217298 | A1 | 7/2024 | Schubart et al. | |
| 2024/0286483 | A1 | 8/2024 | Drach et al. | |
| 2024/0343084 | A1 | 10/2024 | Schubart et al. | |
| 2025/0010675 | A1 | 1/2025 | Ellifson et al. | |
| 2025/0229589 | A1 | 7/2025 | Ellifson | |
| 2025/0236145 | A1 | 7/2025 | Ellifson et al. | |

* cited by examiner

VOCATIONAL VEHICLE WITH COMPACT SUSPENSION ASSEMBLY

CROSS-REFERENCE TO RELATED PATENT APPLICATIONS

This application claims the benefit of and priority to U.S. Provisional Patent Application No. 63/662,744, filed on Jun. 21, 2024, which is incorporated herein by reference in its entirety.

BACKGROUND

Vehicles typically include a suspension coupled between a chassis and one or more tractive elements (e.g., wheels, tracks, etc.) to absorb and/or dampen road forces acting on the tractive elements.

SUMMARY

At least one embodiment relates to a suspension assembly for a vehicle. The vehicle includes a chassis having a frame rail. The suspension assembly includes a knuckle, a subframe coupled to the frame rail by a plurality of brackets, an H-arm coupled between the knuckle and the subframe, an upper control arm arranged above the H-arm and coupled between the knuckle and the subframe, and a dual spring assembly biased between the knuckle and the subframe. The dual spring assembly includes a first spring that is nested within and arranged in series with a second spring, and the first spring defines a lower spring rate than the second spring.

At least one embodiment relates to a suspension assembly for a vehicle. The vehicle includes a chassis having a frame rail. The suspension assembly includes a knuckle, a wheel end assembly coupled to the knuckle and including a wheel hub and a brake assembly, a subframe coupled to the frame rail by a plurality of brackets, an H-arm coupled between the knuckle and the subframe, an upper control arm arranged above the H-arm and coupled between the knuckle and the subframe, and a dual spring assembly biased between the knuckle and the subframe. The knuckle, the subframe, the H-arm, the upper control arm, the dual spring assembly, and the wheel end assembly are coupled to one another to form a subassembly that is coupled to the frame rail as a single unit by the plurality of brackets.

At least one embodiment relates to a vehicle that includes a chassis having a frame rail, a battery supported on the chassis, and a suspension assembly. The suspension assembly includes a knuckle, a subframe coupled to the frame rail by a plurality of brackets, an H-arm coupled between the knuckle and the subframe, an upper control arm arranged above the H-arm and coupled between the knuckle and the subframe, and a dual spring assembly biased between the knuckle and the subframe. The dual spring assembly includes a first spring that is nested within and arranged in series with a second spring, and the first spring defines a lower spring rate than the second spring.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Vehicle

Figure 1:
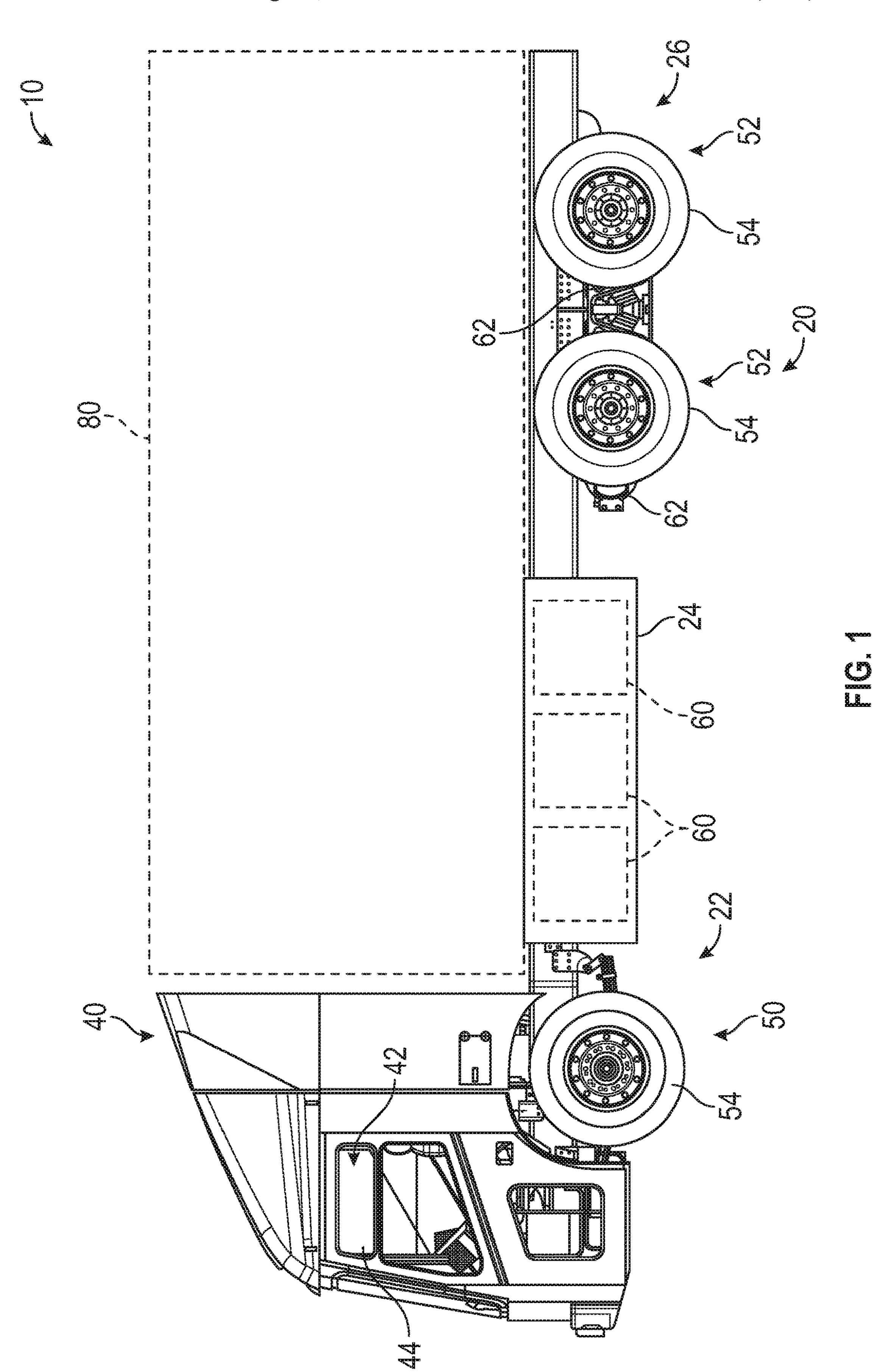
FIG. 1 is a left side view of a vehicle, according to an exemplary embodiment.

According to an exemplary embodiment, as shown in FIG. 1, a vocational vehicle (e.g., a vehicle assembly, a truck, a vehicle base, etc.), shown as vehicle 10, includes a frame assembly or chassis assembly, shown as chassis 20. The chassis assembly may support other components of the vehicle 10. In some embodiments, the chassis 20 extends longitudinally along a length of the vehicle 10. The chassis 20 may extend substantially parallel to a primary direction of travel of the vehicle 10. In some embodiments, the chassis 20 includes a middle section 24 that acts as a storage portion that includes one or more vehicle components. The middle section 24 may include an enclosure that contains one or more vehicle components and/or a frame that supports one or more vehicle components. In some embodiments, the middle section 24 contains or includes one or more electrical energy storage devices (e.g., batteries, capacitors, etc.).

According to an exemplary embodiment, a cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. In one embodiment, the cab interior 42 contains components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

According to an exemplary embodiment, the vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. In one embodiment, the vehicle 10 includes a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle 10.

In some embodiments, the vehicle 10 is configured as an electric vehicle that is propelled by an electric powertrain system. As shown in FIG. 1, the vehicle 10 includes one or more electrical energy storage devices (e.g., batteries, battery packs, battery cells, capacitors, etc.), shown as batteries 60. As shown, the batteries 60 are supported on the chassis 20 (e.g., between the frame rails of the chassis 20). In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10 or within the axle assemblies.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system includes a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 is further configured to support non-hybrid powertrains. For example, the powertrain system may include a primary driver that is a compression-ignition internal combustion engine that utilizes diesel fuel.

As shown in FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 2-7 illustrate various examples of how the vehicle 10 may be configured for specific vocational applications. Although only a certain set of vehicle configurations is shown, it should be understood that the vehicle 10 may be configured for use in other applications that are not shown.

According to an exemplary embodiment, the application kit 80 includes various actuators to facilitate certain functions of the vehicle 10. In one embodiment, the application kit 80 includes hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. In another embodiment, the application kit 80 includes hydraulic or pneumatic components that form a hydraulic or pneumatic circuit (e.g., conduits, valves, pumps, compressors, gauges, reservoirs, accumulators, etc.). By way of another embodiment, the application kit 80 includes electrical components (e.g., batteries, capacitors, voltage regulators, motor controllers, etc.). The actuators may be powered by components of the vehicle 10. In some embodiments, the actuators are powered by the batteries 60, the drive motors 62, or the primary driver (e.g., through a power take off).

Figure 2:
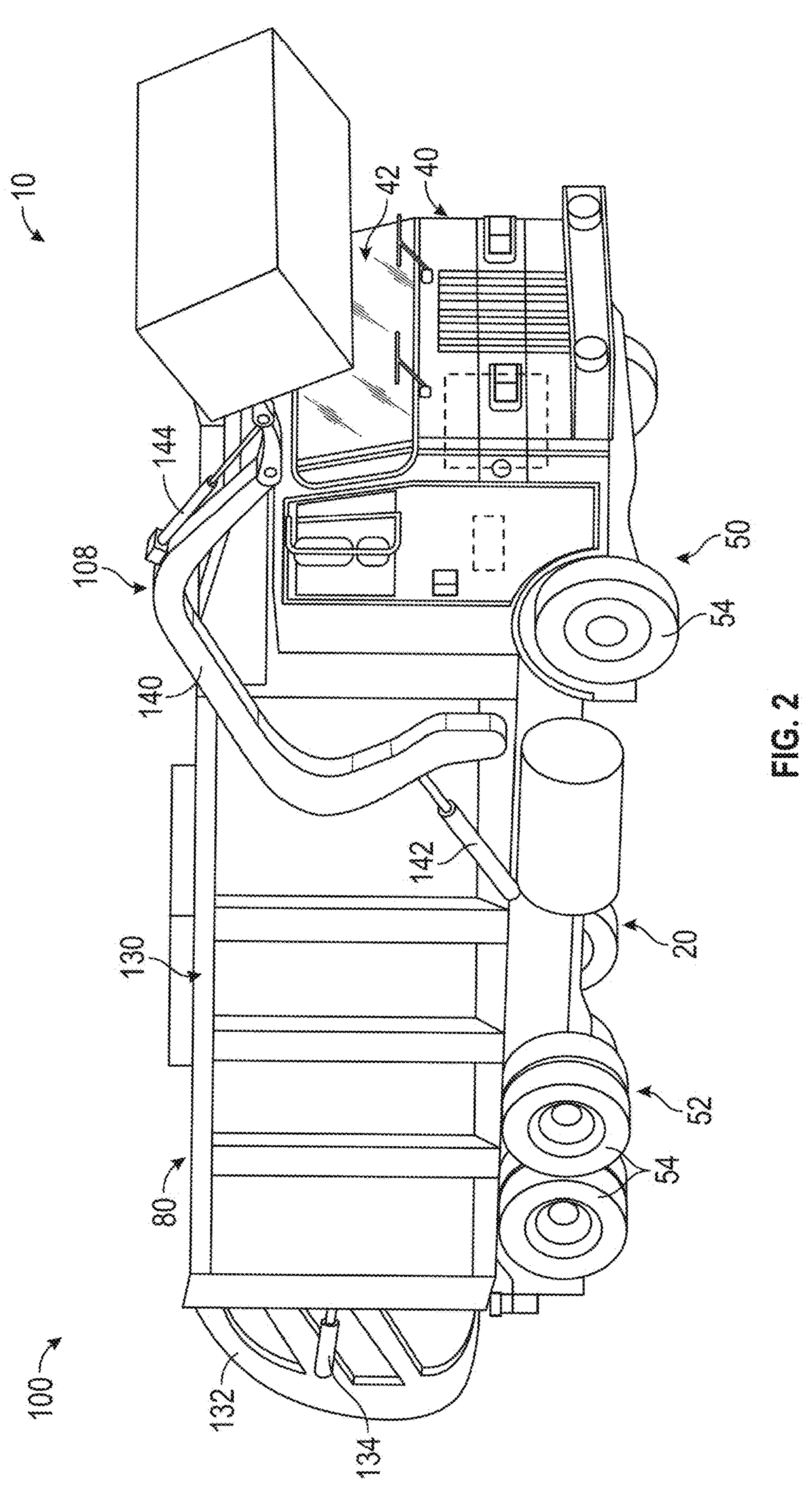
FIG. 2 is a perspective view of the vehicle of FIG. 1 configured as a refuse vehicle, according to an exemplary embodiment.

As shown in FIG. 2, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 2, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). According to an exemplary embodiment, loose refuse is placed into the refuse compartment 130 to be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 2, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20. In another embodiment, the lift arms 140 are rotatably coupled to the refuse compartment 30 on each side of the refuse vehicle 100 (e.g., through a pivot, a lug, a shaft, etc.). Such an embodiment provides that the lift assembly 108 extends forward relative to the cab 40 (e.g., a front-loading refuse truck, etc.). In other embodiments, the lift assembly 108 extends rearward relative to the application kit 80 (e.g., a rear-loading refuse truck). In yet other embodiments, the lift assembly 108 extends from a side of the application kit 80 (e.g., a side-loading refuse truck). The lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container) in order to assist in tipping refuse out of the refuse container and into the refuse compartment 130. The lift arm actuators 142 may then rotate the lift arms 140 to return the empty refuse container to the ground.

Figure 3:
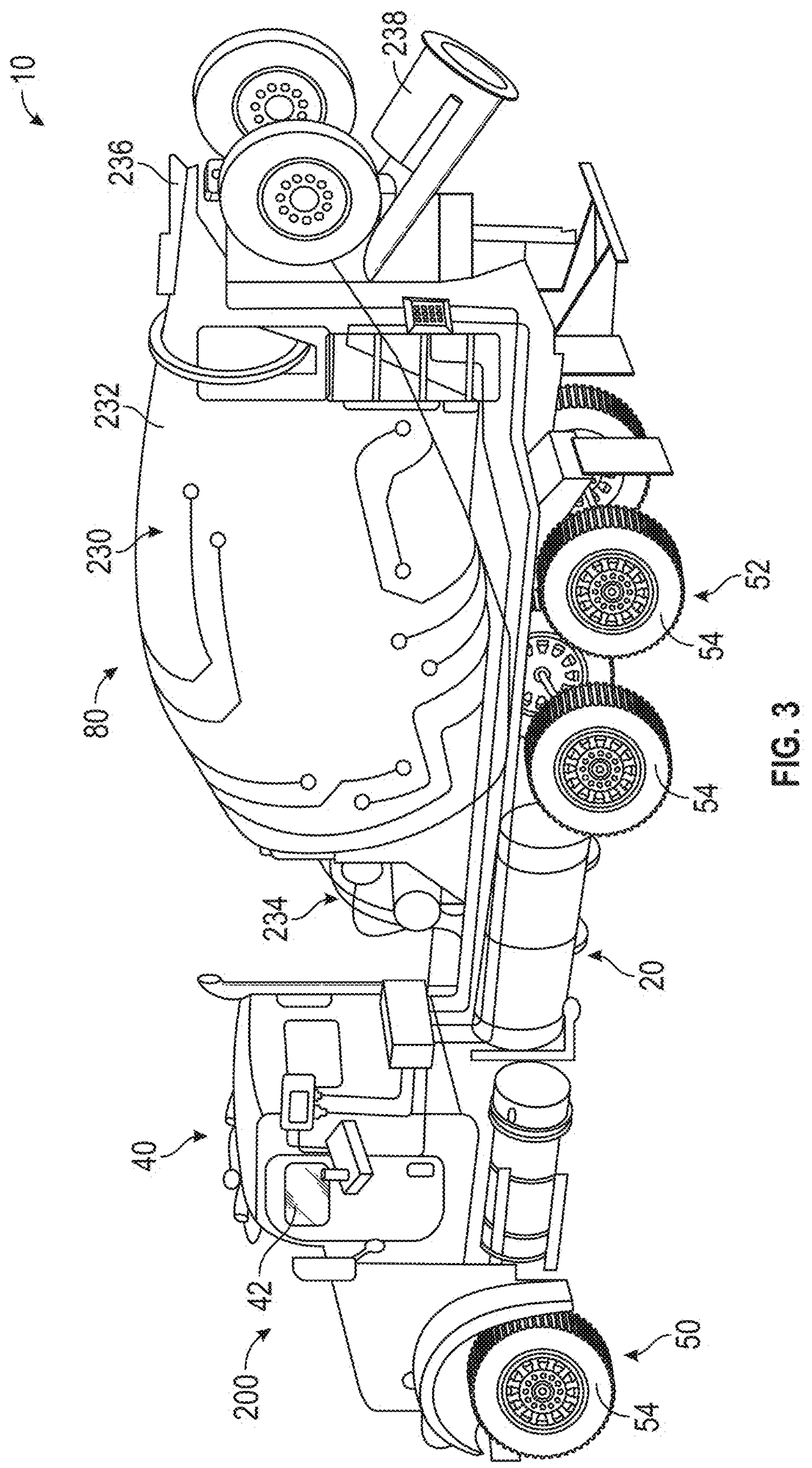
FIG. 3 is a perspective view of the vehicle of FIG. 1 configured as a mixer vehicle, according to an exemplary embodiment.

According to another exemplary embodiment, as shown in FIG. 3, the vehicle 10 is configured as a mixer truck (e.g., a concrete mixer truck, a mixer vehicle, etc.), shown as mixer truck 200. Specifically, the mixer truck 200 is a rear-discharge concrete mixer truck. In other embodiments, the mixer truck 200 is a front-discharge concrete mixer truck.

As shown in FIG. 3, the application kit 80 includes a mixing drum assembly (e.g., a concrete mixing drum), shown as drum assembly 230. The drum assembly 230 includes a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plan extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves). The injection system may include an injection valve that selectively fluidly couples a supply of fluid to the inner volume of the mixing drum 232. In one embodiment, the injection system is used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 includes an actuator positioned such that the chute 238 may be selectively pivotable to position the chute 238 (e.g., vertically, laterally, etc.), for example, at an angle at which the mixture is expelled from the mixing drum 232.

Figure 4:
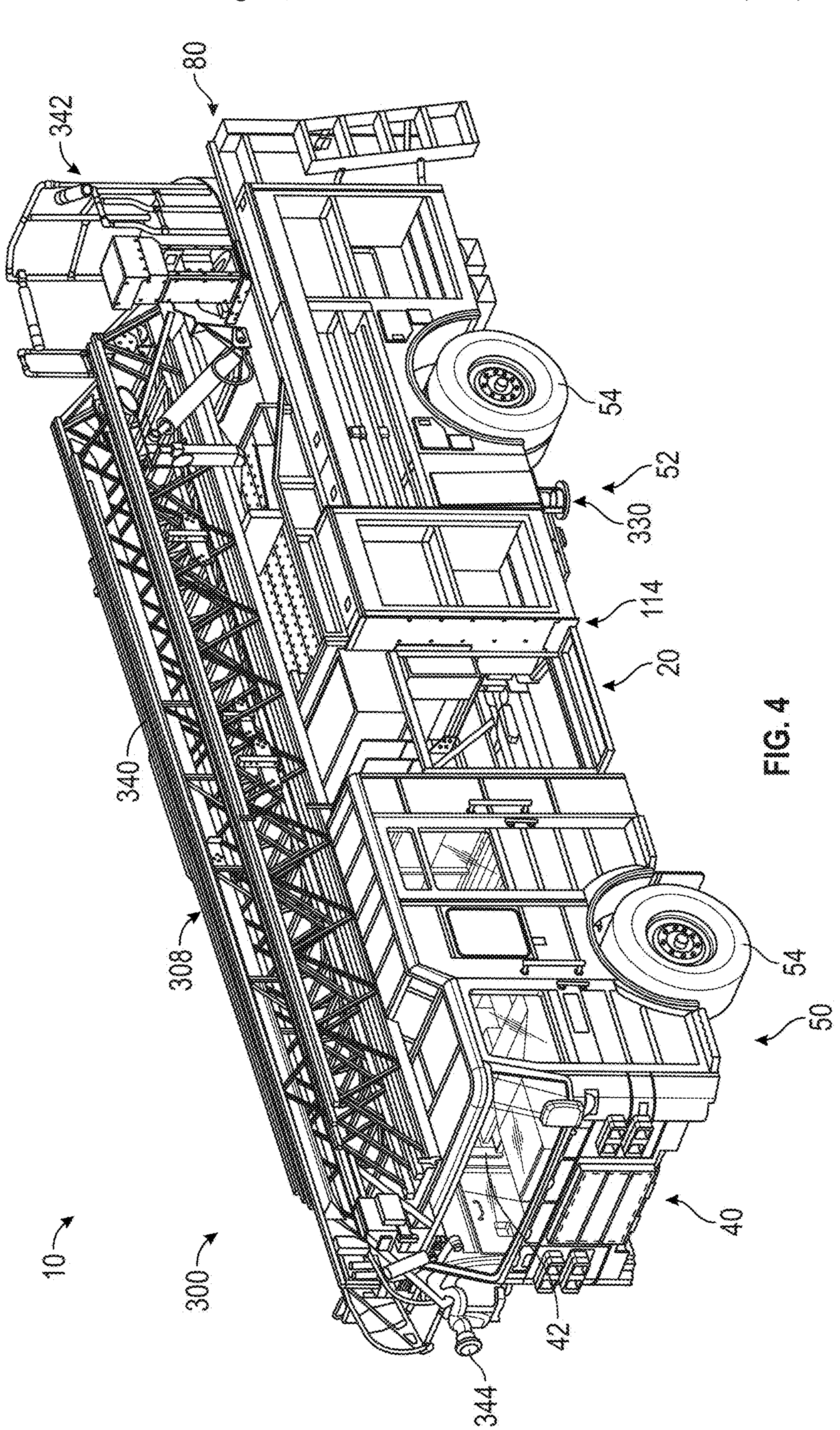
FIG. 4 is a perspective view of the vehicle of FIG. 1 configured as a fire fighting vehicle, according to an exemplary embodiment.

As shown in FIG. 4, the vehicle 10 is configured as a fire fighting vehicle or fire apparatus (e.g., a turntable ladder truck, a pumper truck, a quint, etc.), shown as fire fighting vehicle 300. As shown in FIG. 4, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. According to an exemplary embodiment, the vehicle 10 is be configured as a police vehicle, an ambulance, a tow truck, or still other vehicles used for responding to a scene (e.g., an accident, a fire, an incident, etc.).

As shown in FIG. 4, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that are selectively opened and/or accessed for storage and/or component inspection, maintenance, and/or replacement.

As shown in FIG. 4, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope) relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 5:
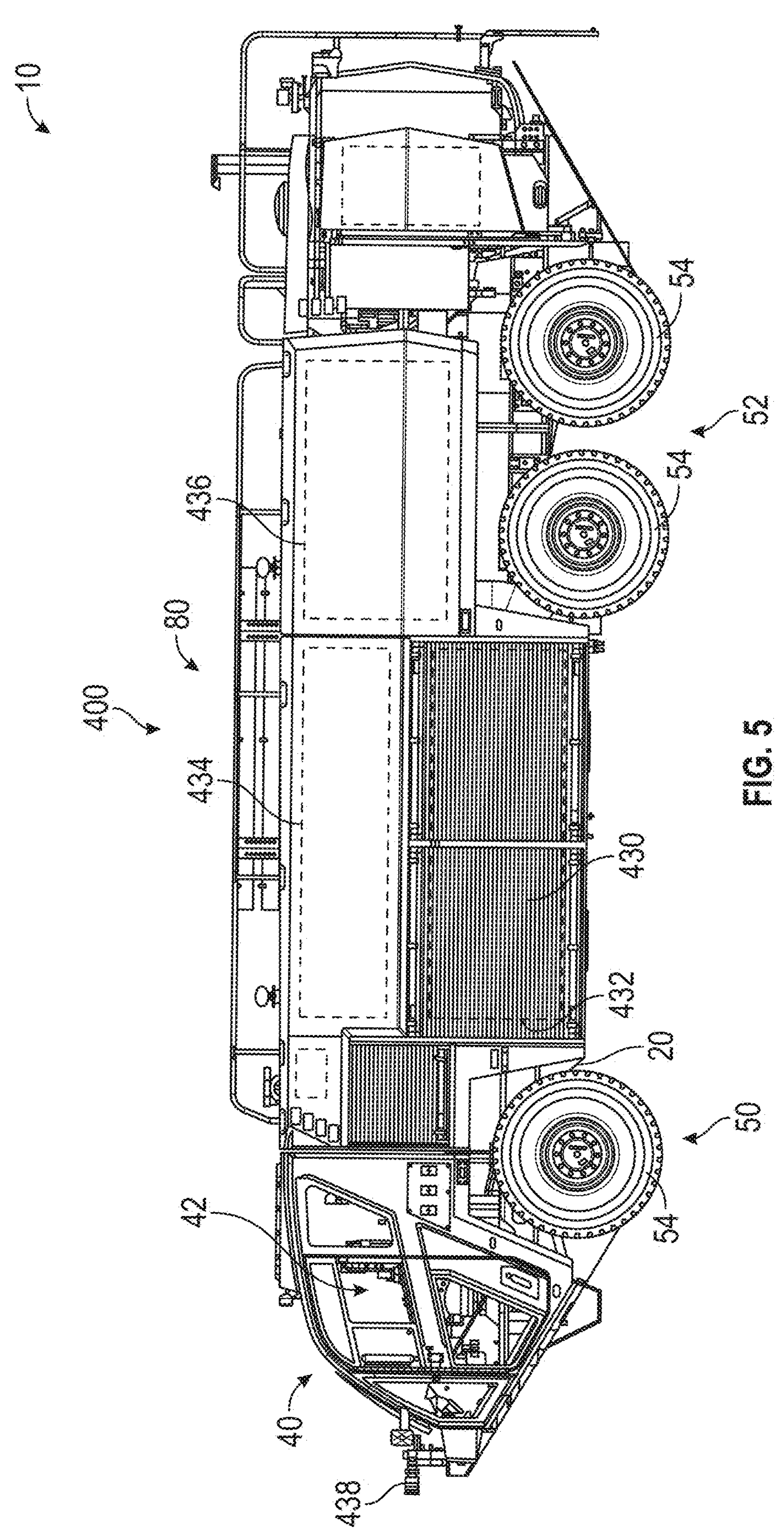
FIG. 5 is a left side view of the vehicle of FIG. 1 configured as an airport fire fighting vehicle, according to an exemplary embodiment.

According to another exemplary embodiment, as shown in FIG. 5, the vehicle 10 is configured as a fire fighting vehicle, shown as airport rescue and fire fighting (ARFF) truck 400. As shown in FIG. 5, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80, as shown in FIG. 5, includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 5, the monitor 438 is coupled to a front end of the cab 40.

Figure 6:
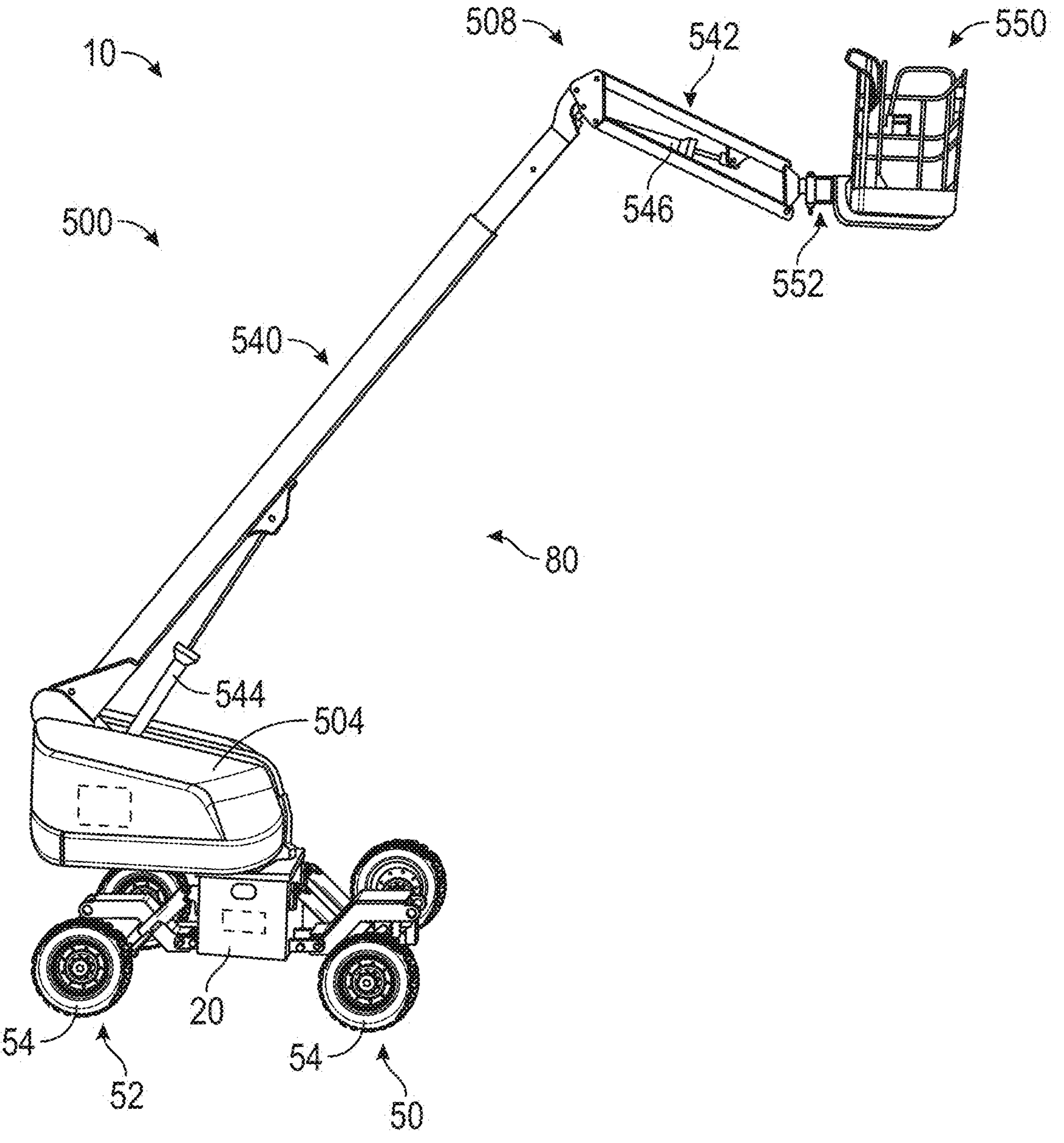
FIG. 6 is a perspective view of the vehicle of FIG. 1 configured as a boom lift, according to an exemplary embodiment.

As shown in FIG. 6, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 6, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 6, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

As shown in FIG. 6, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

According to an exemplary embodiment, the platform assembly 550 provides a platform configured to support one or more operators or users. In some embodiments, the platform assembly 550 includes accessories or tools configured for use by the operators. In one embodiment, the platform assembly 550 includes pneumatic tools (e.g., an impact wrench, airbrush, nail gun, ratchet, etc.), plasma cutters, welders, spotlights, etc. In other embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 7:
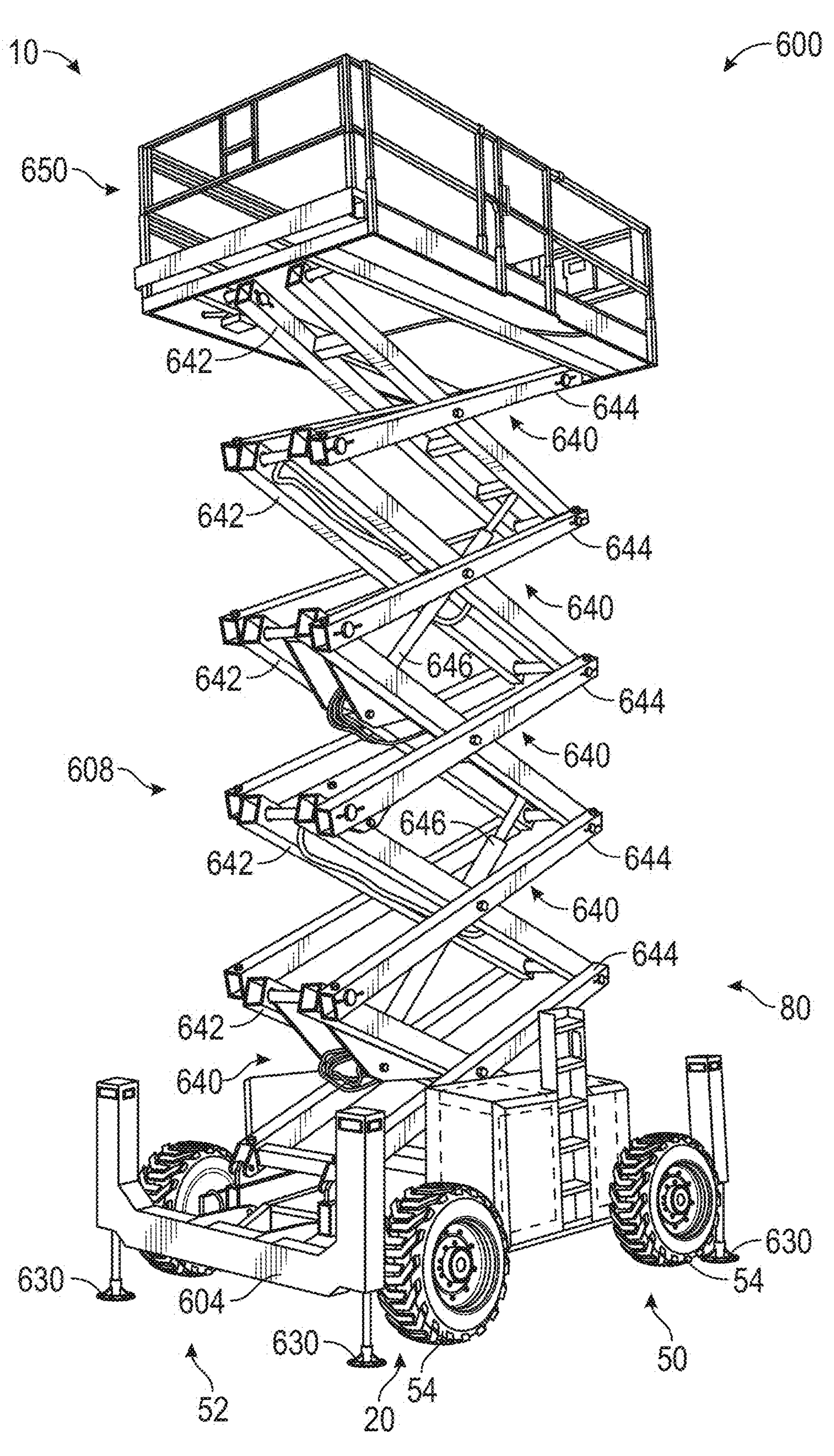
FIG. 7 is a perspective view of the vehicle of FIG. 1 configured as a scissor lift, according to an exemplary embodiment.

According to an exemplary embodiment, as shown in FIG. 7, the vehicle 10 is configured as a lift device, shown as scissor lift 600. As shown in FIG. 7, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 7, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the lift base 604. The length of each of the leveling actuators 630 in their respective deployed positions may be varied in order to adjust the pitch (e.g., rotational position about a lateral axis) and the roll (e.g., rotational position about a longitudinal axis) of the lift base 604 and/or the chassis 20. Accordingly, the lengths of the leveling actuators 630 in their respective deployed positions may be adjusted to level the lift base 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

According to an exemplary embodiment, the lift assembly 608 includes a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the lift base 604. The top ends of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

As shown in FIG. 7, the lift assembly 608 also includes one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

According to an exemplary embodiment, a distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Figure 8:
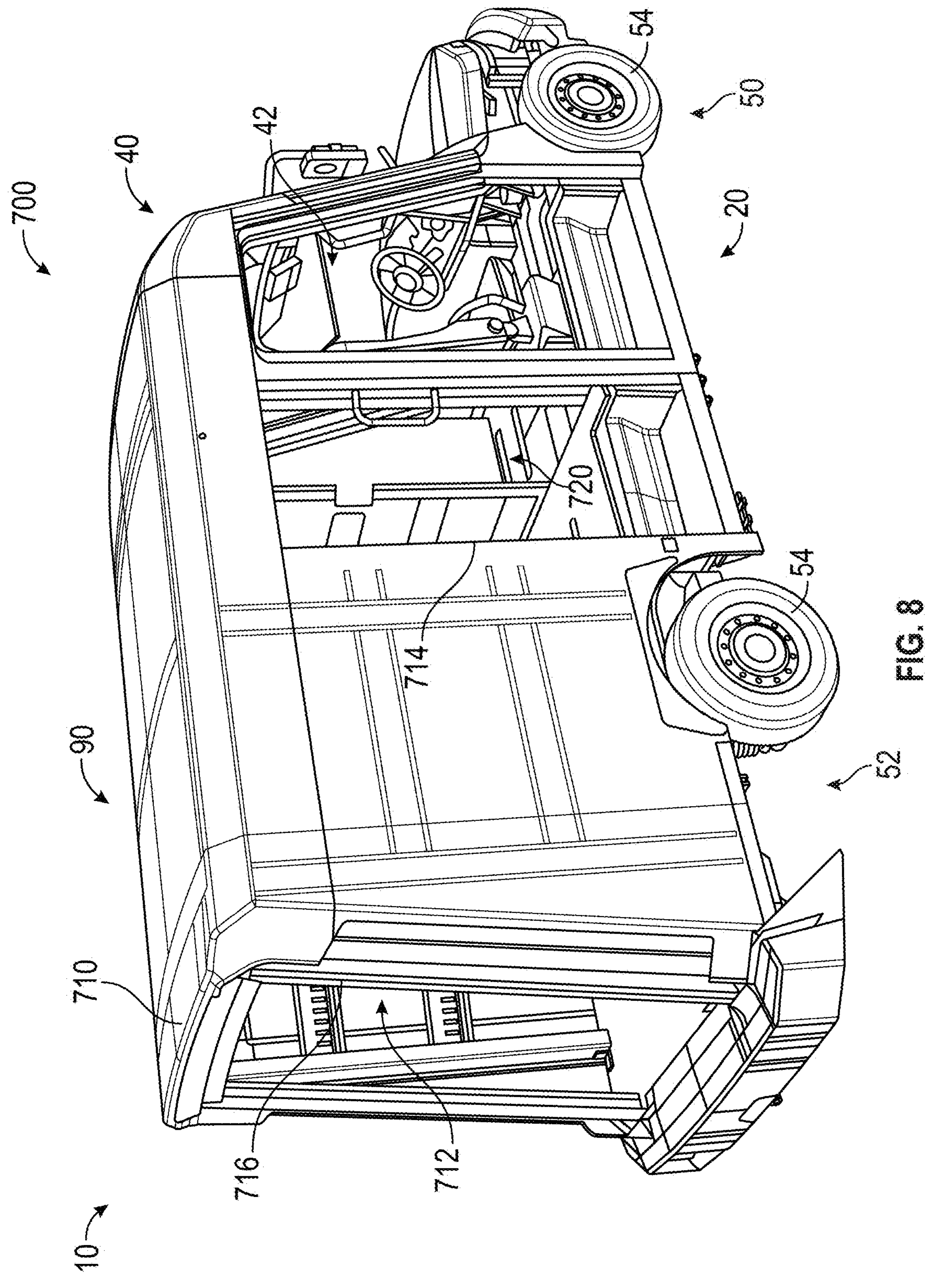
FIG. 8 is a rear perspective view of the vehicle of FIG. 1 configured as a delivery vehicle, according to an exemplary embodiment.
Figure 9:
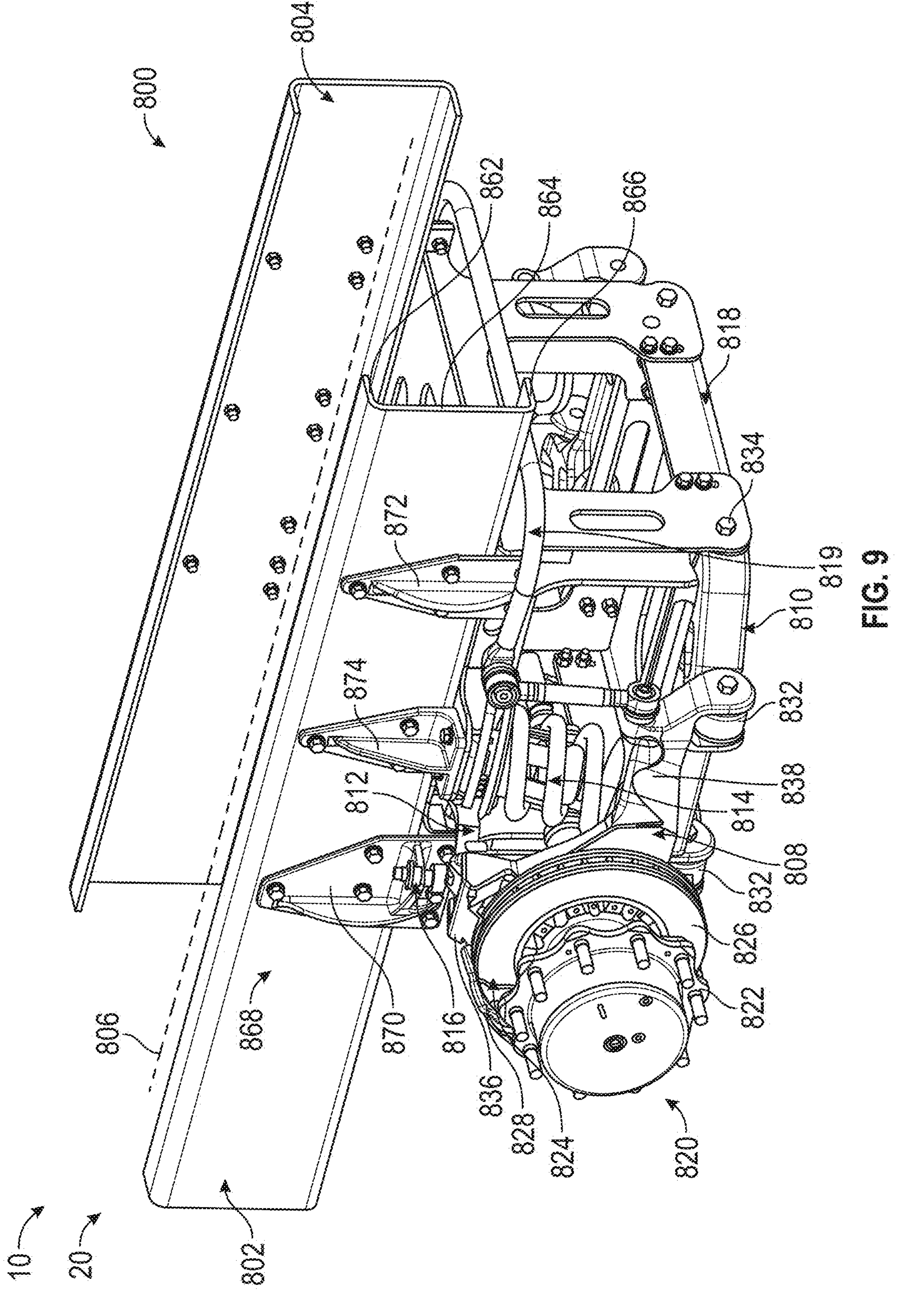
FIG. 9 is a perspective view of a suspension assembly, according to an exemplary embodiment.

As shown in FIG. 8, the vehicle 10 is configured as a delivery vehicle 700 (e.g., a parcel vehicle, a cargo transport vehicle, a mail vehicle, a postal vehicle, a postal van, a truck, a van, etc.). Specifically, the delivery vehicle 700 is a delivery vehicle with a hatch door. In other embodiments, the delivery vehicle 700 does not include a hatch door.

As shown in FIG. 8, the application kit 90 includes a rear storage section, shown as cargo body 710. The cargo body 710 defines an interior section or zone, shown as cargo compartment 712, a first opening, shown as side cargo opening 714, and a second opening, shown as rear cargo opening 716. The side cargo opening 714 is positioned along a right side of the of the delivery vehicle 700 and facilitates ingress into and egress from the cargo compartment 712 from the right side of the delivery vehicle 700. The rear cargo opening 716 is positioned at a rear end of the delivery vehicle 700 and facilitates ingress into and egress from the cargo compartment 712 from the rear end of the delivery vehicle 700. The cargo compartment 712 is configured to receive and store parcels (e.g., mail, packages, etc.) for transport and delivery via the delivery vehicle 700. In some embodiments, the cargo compartment 712 includes cabinets, shelves, racks, and/or other storage devices to facilitate organizing and securing the parcels within the cargo compartment 712.

As shown in FIG. 8, the application kit 90 defines an opening, shown as passageway 720, that connects the cab interior 42 to the cargo compartment 712. In some embodiments, the application kit 90 includes a door or gate that at least partially and selectively encloses the passageway 720. In other embodiments, the application kit 90 includes a full partition that completely segregates the cab interior 42 from the cargo compartment 712.

Suspension Assembly

FIGS. 9-14 illustrated a suspension assembly 800 of a vocational vehicle (e.g., an electrified vehicle, a commercial vehicle, a refuse vehicle, a fire fighting vehicle, a fire suppression vehicle, a military vehicle, a mixing vehicle, a lift vehicle, a delivery vehicle, the vehicle 10, etc.). In some embodiments, the suspension assembly 800 is included on any configuration of the vehicle 10 described herein. In general, the suspension assembly 800 is coupled to the chassis 20 and one or more axles (e.g., the front axle 50 and/or the rear axle 52). In some embodiments, the chassis 20 includes a pair of frame portions, frame members, or frame rails, shown as a first frame rail 802 and a second frame rail 804. The first frame rail 802 is laterally separated from the second frame rail 804, which provides frame stiffness and space for vehicle components (e.g., batteries, motors, axles, gears, etc.) between the first frame rail 802 and the second frame rail 804. The first frame rail 802 and the second frame rail 804 both extend longitudinally and parallel to one another (e.g., parallel to a central longitudinal axis 806) and along a length of the vehicle. In some embodiments, the first frame rail 802 and the second frame rail 804 both define a C-shaped cross-section (see, e.g., FIG. 10), for example, taken along an axis perpendicular to the central longitudinal axis 806. In some embodiments, the first frame rail 802 and the second frame rail 804 define other shapes (e.g., I-beams, rectangular beams, etc.).

The suspension assembly 800 includes a knuckle 808, a lower control arm or H-arm 810, a control link, upper control arm, or upper control link 812, a dual spring assembly 814, a damper 816, a subframe 818, a strut bar linkage 819, and a wheel end assembly 820 having a wheel hub 822 and a brake assembly 824 (e.g., a rotor 826 and a caliper 828). The knuckle 808 is coupled to the wheel end assembly 820 and the wheel hub 822 is configured to couple to a tractive element or wheel (e.g., a wheel 54). In general, the suspension assembly 800 is configured to independently suspend the wheel hub 822 (i.e., the suspension assembly 800 is an independent suspension). It should be appreciated that although one side of the suspension assembly 800 is illustrated below the first frame rail 802, the vehicle 10 may include a plurality of the suspension assemblies 800 coupled to each of the wheels 54 thereof, with the suspension assemblies 800 being reflectionally symmetric about the central longitudinal axis 806 (e.g., coupled to both the first frame rail 802 and the second frame rail 804).

The lower control arm 810 is generally H-shaped (e.g., an H-arm) and is coupled between the knuckle 808 and the subframe 818. In general, the H-shape defined by the lower control arm 810 is formed by the lower control arm 810 including four pivot joints that extend outwardly (e.g., transverse relative to the central longitudinal axis 806) from a cross member 830 (see, e.g., FIG. 13). For example, the lower control arm 810 is coupled to the knuckle 808 by a first set of two pivot joints 832 and coupled to the subframe 818 by a second set of two pivot joints 834. In some embodiments, the pivot joints 832 and the pivot joints 834 are formed by apertures formed in extension portions of the lower control arm 810 that extend outwardly from the cross member 830. In some embodiments, the apertures receive a bushing, pin, or bearing, and/or form a ball joint at the pivot joints 832 and the pivot joints 834. In the illustrated embodiment, the pivot joints 832 are coupled to a lower end of the knuckle 808 (e.g., an end furthest from the frame rail 802) at longitudinally opposing ends of the knuckle 808 (e.g., ends spaced along the central longitudinal axis 806). The pivot joints 834 are coupled to a lower end of the subframe 818 (e.g., an end furthest from the frame rail 802) at longitudinally opposing ends of the subframe 818 (e.g., ends spaced along the central longitudinal axis 806). The design and shape of the lower control arm 810 enables the lower control arm 810 to perform both stabilization and steering functions for the wheel hub 822, which negates the need for the suspension assembly 800 to include a separate steering arm/link and makes the suspension assembly 800 more compact and light weight compared to conventional suspension assemblies.

The upper control link 812 is coupled between the knuckle 808 and the subframe 818, and is generally arranged above the lower control arm 810 (e.g., the upper control link 812 is arranged closer to the first frame rail 802 than the lower control arm 810). Specifically, the upper control link 812 is coupled to a distal end of an upper extending portion 836 of the knuckle 808. The upper extending portion 836 extends upwardly (e.g., in a direction toward the frame rail 802) from a base portion 838 of the knuckle 808. In general, the knuckle 808 defines an asymmetric shape, with the upper extending portion 836 being offset from a center plane that intersects a centerline of the base portion 838 (e.g., a plane that intersects the centerline and is perpendicular to the center longitudinal axis 806). In other words, the upper extending portion 836 is offset toward one longitudinal side of the knuckle 808 (e.g., closer to one of the pivot joints 832, 834 than the other). This asymmetric shape defined by the knuckle 808 makes the suspension assembly 800 more compact and light weight compared to conventional suspension assemblies.

In the illustrated embodiment, the upper control link 812 includes two connection points, one arranged at each distal end of the upper control link 812. In this way, for example, the upper control link 812 acts as a two-force member in the suspension assembly 800, with forces acting on the upper control link 812 only at the two connection points. With the lower control arm 810 performing several functions in the suspension assembly 800, the design of the upper control link 812 is simplified (i.e., a two-force member), which further aids in making the suspension assembly 800 more compact and light weight compared to conventional suspension assemblies.

The dual spring assembly 814 is coupled and biased between the knuckle 808 and the subframe 818. In general, the dual spring assembly 814 includes a first spring 842 that is nested within and arranged in series with a second spring 844, and the first spring 842 defines a lower spring rate than the second spring 844. In this way, for example, the dual spring assembly 814 can provide dual-rate cushioning at various vehicle weights. With specific reference to FIG. 14, the dual spring assembly 814 includes a lower spring perch 846, an upper spring perch 848, and a spring coupler 850. The lower spring perch 846 is formed by the knuckle 808. Specifically, the lower spring perch 846 is formed integrally with the base portion 838 of the knuckle 808 as a unitary component. The lower spring perch 846 extends upwardly from the base portion 838 of the knuckle 808 (e.g., toward the first frame rail 802). As described herein, the knuckle 808 is designed with an asymmetric shape, which is further exemplified by the lower spring perch 846 being arranged longitudinally between the pivot joints 832 (e.g., in a direction along the center longitudinal axis 806) and the upper extending portion 836 being arranged longitudinally between the dual spring assembly 814 and the damper 816 (see, e.g., FIGS. 11-13).

The upper spring perch 848 is coupled to the subframe 818 below the first frame rail 802. The spring coupler 850 is arranged between the lower spring perch 846 and the upper spring perch 848 and both the first spring 842 and the second spring 844 are biased against the spring coupler 850. In the illustrated embodiment, the spring coupler 850 defines a generally cup- or U-shaped profile in cross-section and includes an outer flange 852, an inner flange 854, and an annular wall 856 extending axially between the outer flange 852 and the inner flange 854 (e.g., with respect to a spring axis 858 along which the first spring 842 and the second spring 844 are arranged concentrically and coaxially). The outer flange 852 extends radially outwardly (e.g., with respect to the spring axis 858) from an upper end of the annular wall 856 (e.g., an end closer to the upper spring perch 848). The inner flange 854 extends radially inwardly (e.g., with respect to the spring axis 858) from a lower end of the annular wall 856 (e.g., an end closer to the lower spring perch 846). The annular wall 856 extends axially between the outer flange 852 and the inner flange 854 and defines a spring cavity that receives at least a portion of the first spring 842.

Figure 14:
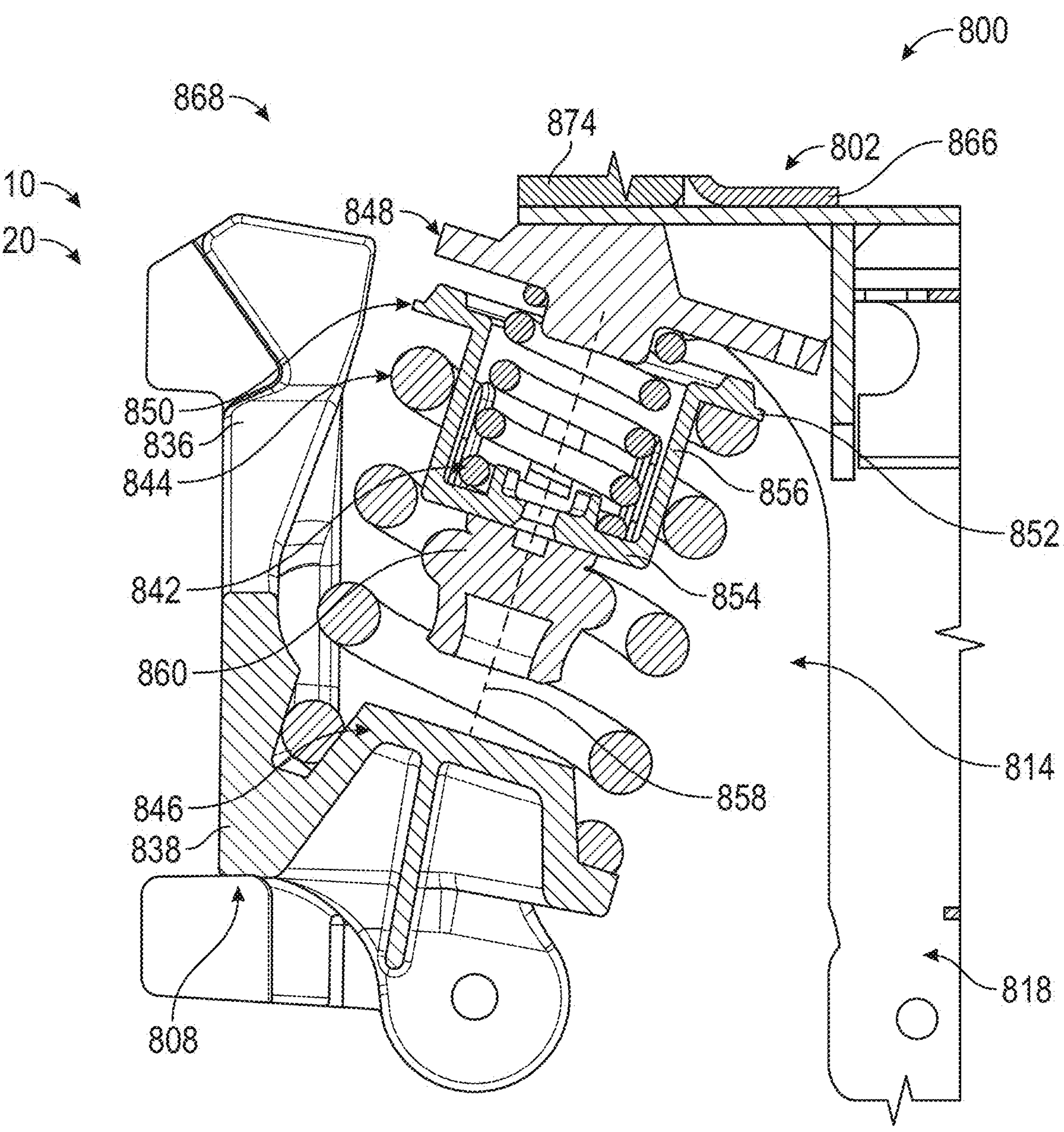
FIG. 14 is a cross-sectional view of the suspension assembly of FIG. 11 taken along line 14-14.

The first spring 842 is coupled and biased between the upper spring perch 848 and the inner flange 854. Specifically, the first spring 842 extends from the upper spring perch 848, into the spring cavity, and is biased against the inner flange 854. The second spring 844 is coupled and biased between the lower spring perch 846 and the outer flange 852. With both springs being biased against the spring coupler 850, the spring coupler 850 is allowed to float between the lower spring perch 846 and the upper spring perch 848, in some operating conditions, as shown in FIG. 14. And the use of the spring coupler 850 and two springs with different spring rates enables the first spring 842 to provide cushioning below a first vehicle weight (e.g., defined by the biasing force supplied by the first spring 842 and the first spring rate) and the second spring 844 to provide cushioning above the first vehicle weight. Specifically, the first spring 842 is configured to provide cushioning below the first vehicle weight (e.g., a first vehicle weight threshold), and above the first vehicle weight, the first spring 842 is configured to compress so that the spring coupler 850 bottoms out and the outer flange 852 engages the upper spring perch 848. With the spring coupler 850 bottomed out, the first spring 842 does not provide any cushioning and the second spring 844 provides all of the cushioning above the first vehicle weight. As the suspension system 800 enters increasing jounce travel, a jounce bumper 860, which is coupled to the lower end of the spring coupler 850, will engage (e.g., engage the lower spring perch 846) along with the second spring 844, until full jounce where a hard stop will engage and prevent any further suspension travel.

With reference to FIGS. 9-13, the damper 816 is coupled between the knuckle 808 and the first frame rail 802 and is configured to absorb or damp forces from the wheel hub 822 that occur during operation/travel of the vehicle 10. In some embodiments, the damper 816 is a piston-cylinder type damper that operates hydraulically or pneumatically. In some embodiments, the damper 816 may be coupled to the first frame rail 802 by a frame bracket, and the damper 816 may be coupled to the knuckle 808 by a knuckle bracket.

Figure 10:
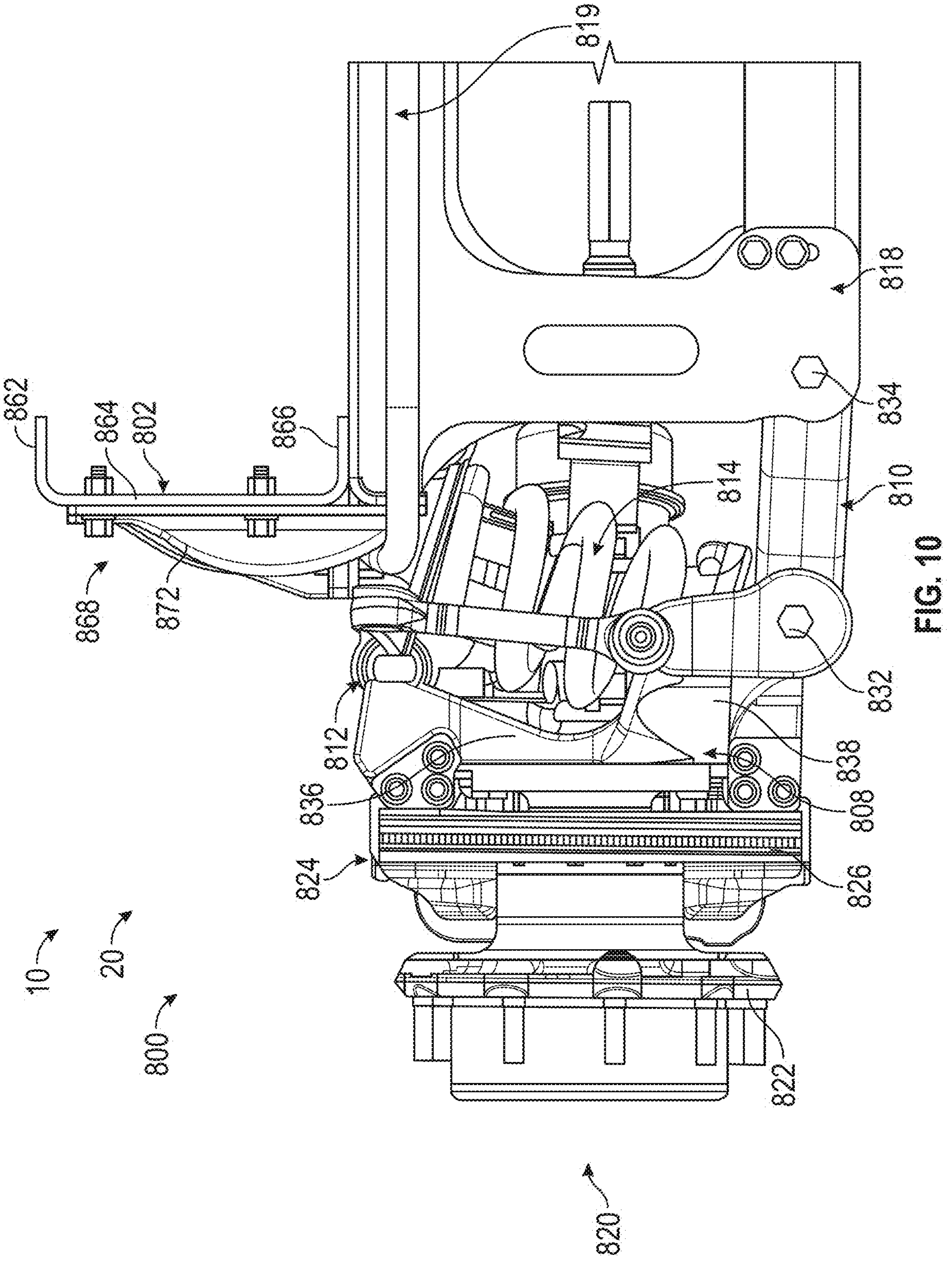
FIG. 10 is a rear view of the suspension assembly of FIG. 9.
Figure 11:
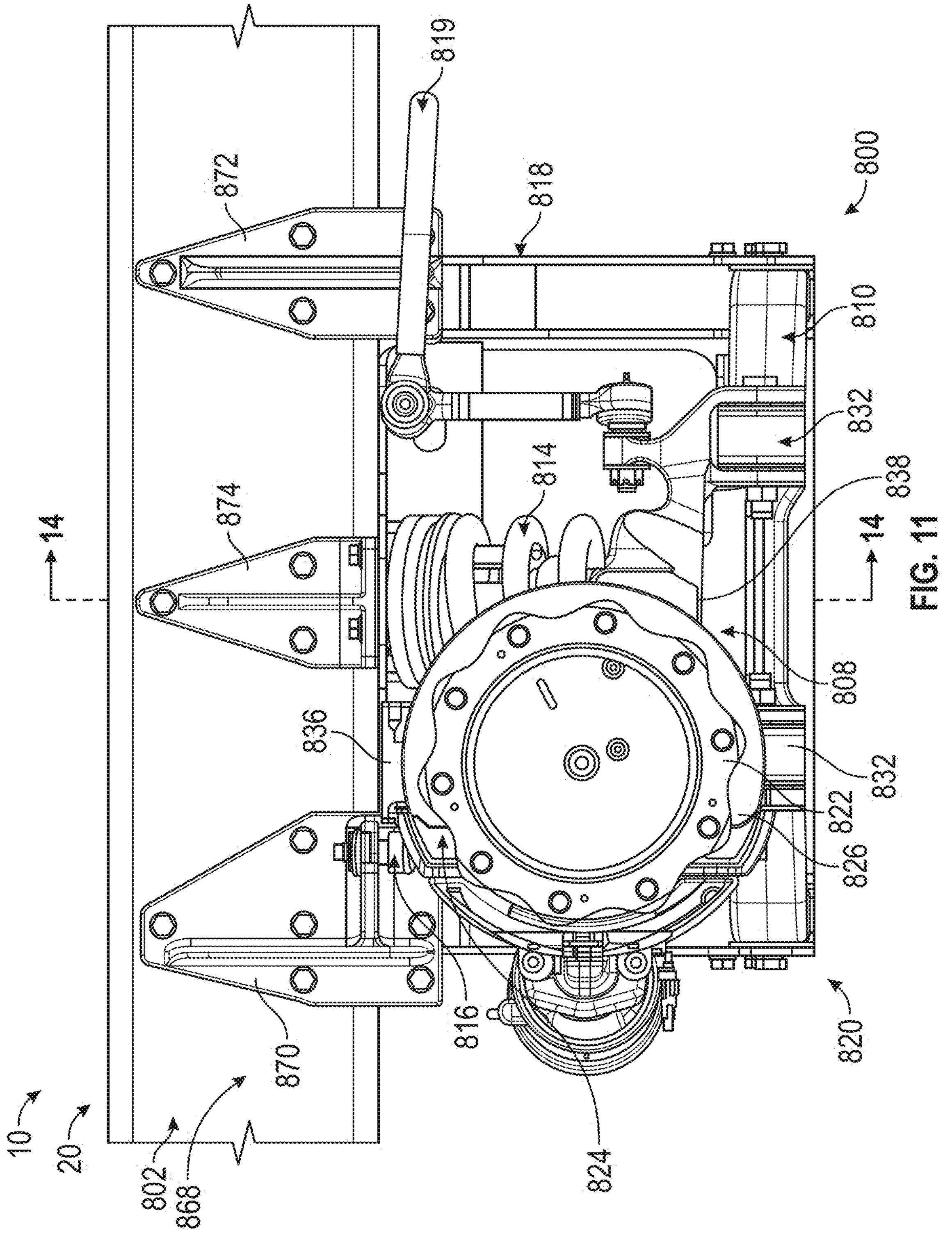
FIG. 11 is a side view of the suspension assembly of FIG. 9.
Figure 12:
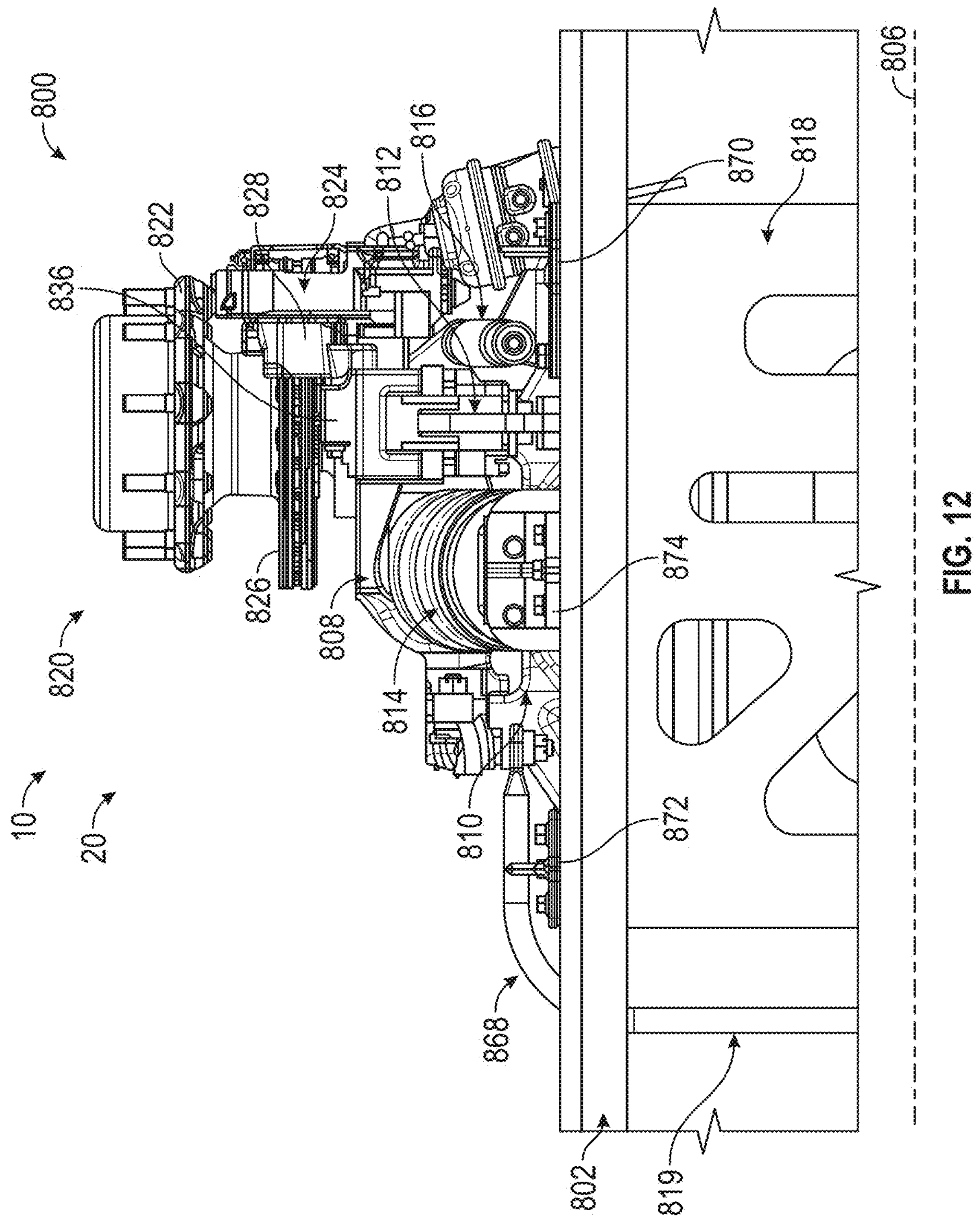
FIG. 12 is a top view of the suspension assembly of FIG. 9.
Figure 13:
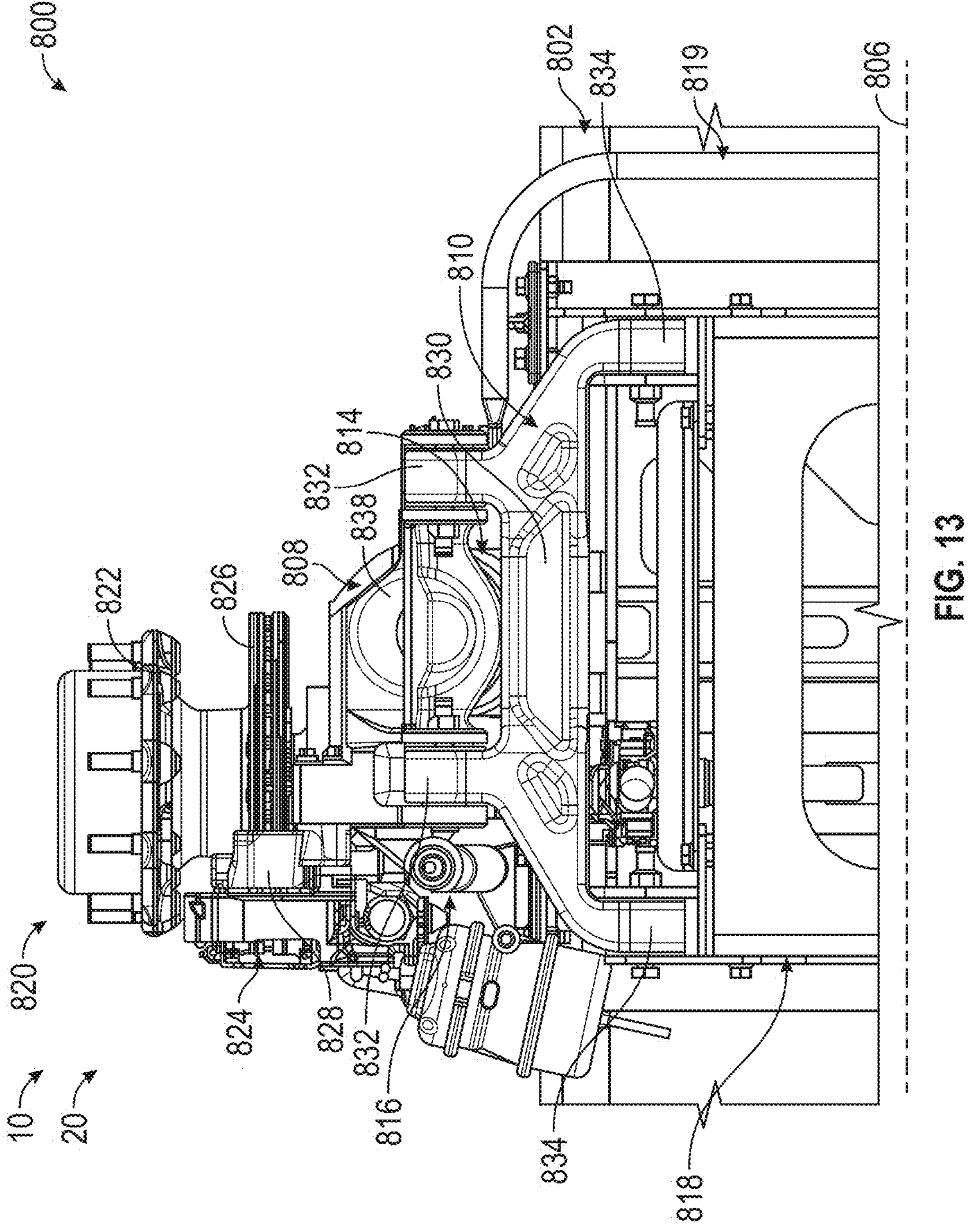
FIG. 13 is a bottom view of the suspension assembly of FIG. 9.

In the illustrated embodiment, the subframe 818 is arranged below the first frame rail 802 and the second frame rail 804 and extends laterally between the first frame rail 802 and the second frame rail 804 (see, e.g., FIG. 10). For example, the first frame rail 802 and the second frame rail 804 both include a first or upper wall 862, a side wall 864 that extends substantially perpendicularly from the upper wall 862, and a second or lower wall 866 that extends substantially perpendicularly from the side wall 864 and is arranged substantially parallel to the upper wall 862. The lower wall 866 defines a bottom surface that extends along a bottommost portion of the lower wall 866. In some embodiments, the subframe 818 is arranged below the bottom surface. In some embodiments, the subframe 818 houses a differential that forms part of an axle. In some embodiments, the subframe 818 houses at least a portion of an electric axle (e-axle).

In general, the subframe 818 is formed by a framework of plates and other linkages that are all coupled together so that the subframe 818 forms a single component that couples to the chassis 20 with the other components of the suspension assembly 800 (e.g., the knuckle 808, the lower control arm 810, the upper control link 812, the dual spring assembly 814, the damper 816, the strut bar linkage 819, and the wheel end assembly 820). Specifically, the knuckle 808, the lower control arm 810, the upper control link 812, the dual spring assembly 814, the damper 816, the subframe 818, the strut bar linkage 819, and the wheel end assembly 820 are all coupled to one another to form a subassembly that is coupled to the chassis 20 as a single unit by a plurality of brackets 868. In this way, for example, the suspension assembly 800 may be assembled and manufactured separately from the chassis 20 and then bolted onto the chassis 20 (e.g., onto the first frame rail 802 as illustrated in FIGS. 9-13, and onto the second frame rail 804) as a single unit using the plurality of brackets 868. Said differently, once the suspension assembly 800 is assembled and the various components are coupled together, the suspension assembly 800 is configured to be lifted as a single unit and coupled to the first frame rail 802 and the second frame rail 804 using the plurality of brackets 868.

In the illustrated embodiment, the plurality of brackets 868 include a first bracket 870 coupled to a first longitudinal end of the subframe 818, a second bracket 872 coupled to a second longitudinal end of the subframe 818, and a third bracket 874 coupled to a middle portion of the subframe 818 (e.g., between the first bracket 870 and the second bracket 872). The upper spring perch 848 is coupled to the subframe 818 below the third bracket 874. In the illustrated embodiment, each of the first bracket 870, the second bracket 872, and the third bracket 874 is coupled between the first frame rail 802 and the subframe 818.

The suspension assembly 800 includes several components that are arranged below the chassis 20 (e.g., below the first frame rail 802 and the second frame rail 804). In general, by arranging components below the first frame rail 802 and the second frame rail 804, a lateral distance between the first frame rail 802 and the second frame rail 804 can be increased, when compared to conventional chassis designs, to provide more space for mounting batteries or battery packs.

As utilized herein with respect to numerical ranges, the terms “approximately,” “about,” “substantially,” and similar terms generally mean+/−10% of the disclosed values. When the terms “approximately,” “about,” “substantially,” and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the suspension assembly 800 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A suspension assembly for a vehicle, the vehicle including a chassis having a frame rail, the suspension assembly comprising:

a knuckle;

a subframe coupled to the frame rail by a plurality of brackets;

an H-arm coupled between the knuckle and the subframe;

an upper control arm arranged above the H-arm and coupled between the knuckle and the subframe; and a dual spring assembly biased between the knuckle and the subframe, wherein the dual spring assembly includes a first spring that is nested within and arranged in series with a second spring, and wherein the first spring defines a lower spring rate than the second spring.

2. The suspension assembly of claim 1, wherein the dual spring assembly includes a lower spring perch, an upper spring perch, and a spring coupler.

3. The suspension assembly of claim 2, wherein the first spring is configured to provide cushioning below a first vehicle weight, and wherein, above the first vehicle weight, the first spring is configured to compress so that the spring coupler bottoms out and engages the upper spring perch and the second spring provides cushioning.

4. The suspension assembly of claim 2, wherein the first spring is coupled between the upper spring perch and the spring coupler, and the second spring is coupled between the lower spring perch and the spring coupler.

5. The suspension assembly of claim 4, wherein the upper spring perch is coupled to the subframe, and the lower spring perch is formed by the knuckle.

6. The suspension assembly of claim 4, wherein the spring coupler includes an outer flange and an inner flange.

7. The suspension assembly of claim 6, wherein the first spring is coupled between the upper spring perch and the inner flange, and the second spring is coupled between the lower spring perch and the outer flange.

8. The suspension assembly of claim 1, further comprising a wheel end assembly including a wheel hub and a brake assembly.

9. The suspension assembly of claim 8, wherein the knuckle, the subframe, the H-arm, the upper control arm, the dual spring assembly, and the wheel end assembly are coupled to one another to form a subassembly that is coupled to the frame rail as a single unit by the plurality of brackets.

10. The suspension assembly of claim 1, wherein the plurality of brackets includes a first bracket, a second bracket, and a third bracket, and wherein the third bracket is arranged longitudinally between the first bracket and the second bracket.

11. The suspension assembly of claim 10, wherein each of the first bracket, the second bracket, and the third bracket is coupled between the frame rail and the subframe.

12. The suspension assembly of claim 1, wherein the knuckle includes a base portion and an upper extending portion that is coupled to the upper control arm.

13. The suspension assembly of claim 12, wherein the knuckle defines an asymmetric shape so that the upper extending portion is offset toward one longitudinal side of the knuckle.

14. A suspension assembly for a vehicle, the vehicle including a chassis having a frame rail, the suspension assembly comprising:

a knuckle;

a wheel end assembly coupled to the knuckle and including a wheel hub and a brake assembly;

a subframe coupled to the frame rail by a plurality of brackets;

an H-arm coupled between the knuckle and the subframe;

an upper control arm arranged above the H-arm and coupled between the knuckle and the subframe; and a dual spring assembly biased between the knuckle and the subframe, wherein the knuckle, the subframe, the H-arm, the upper control arm, the dual spring assembly, and the wheel end assembly are coupled to one another to form a subassembly that is coupled to the frame rail as a single unit by the plurality of brackets.

15. The suspension assembly of claim 14, wherein the dual spring assembly includes a first spring that is arranged in series with a second spring, and wherein the first spring defines a different spring rate than the second spring.

16. The suspension assembly of claim 15, wherein the dual spring assembly includes a lower spring perch, an upper spring perch, and a spring coupler, and wherein the first spring is configured to provide cushioning below a first vehicle weight, and wherein, above the first vehicle weight, the first spring is configured to compress so that the spring coupler bottoms out and engages the upper spring perch and the second spring provides cushioning.

17. The suspension assembly of claim 14, wherein the plurality of brackets includes a first bracket, a second bracket, and a third bracket, wherein the third bracket is arranged longitudinally between the first bracket and the second bracket, and wherein each of the first bracket, the second bracket, and the third bracket is coupled between the frame rail and the subframe.

18. The suspension assembly of claim 14, wherein the knuckle includes a base portion and an upper extending portion that is coupled to the upper control arm, and wherein the knuckle defines an asymmetric shape so that the upper extending portion is offset toward one longitudinal side of the knuckle.

19. A vocational vehicle comprising:

a chassis having a frame rail;

a battery supported on the chassis; and a suspension assembly including:

a knuckle;

a subframe coupled to the frame rail by a plurality of brackets;

an H-arm coupled between the knuckle and the subframe;

an upper control arm arranged above the H-arm and coupled between the knuckle and the subframe; and a dual spring assembly biased between the knuckle and the subframe, wherein the dual spring assembly includes a first spring that is nested within and arranged in series with a second spring, and wherein the first spring defines a lower spring rate than the second spring.

20. The vocational vehicle of claim 19, wherein the dual spring assembly includes a lower spring perch, an upper spring perch, and a spring coupler, and wherein the first spring is configured to provide cushioning below a first vehicle weight, and wherein, above the first vehicle weight, the first spring is configured to compress so that the spring coupler bottoms out and engages the upper spring perch and the second spring provides cushioning.

* * * * *